(12) United States Patent
Arduc et al.

(10) Patent No.: US 7,206,678 B2
(45) Date of Patent: Apr. 17, 2007

(54) MOTOR VEHICLE WITH A PRE-SAFE-SYSTEM

(75) Inventors: Senol Arduc, Sindelfingen (DE); Rainer Justen, Altdorf (DE); Thomas Unselt, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 173 days.

(21) Appl. No.: 10/918,751

(22) Filed: Aug. 16, 2004

(65) Prior Publication Data

US 2005/0080530 A1 Apr. 14, 2005

(30) Foreign Application Priority Data

Aug. 16, 2003 (DE) ................. 103 37 620

(51) Int. Cl.
*G06F 7/00* (2006.01)
(52) U.S. Cl. .......................... 701/37; 701/45
(58) Field of Classification Search ............... 701/45, 701/47; 342/60
See application file for complete search history.

(56) References Cited

U.S. PATENT DOCUMENTS 6,480,144 B1 * 11/2002 Miller et al. ................. 342/72
2003/0154011 A1 8/2003 Rao et al.

FOREIGN PATENT DOCUMENTS

| DE | 04046814 A | 2/1992 |
|---|---|---|
| DE | 197 29 960 A1 | 7/1997 |
| DE | 198 41 751 A1 | 3/1998 |
| DE | 198 42 827 A1 | 9/1998 |
| DE | 199 09 432 A1 | 3/1999 |
| DE | 199 23 708 A1 | 5/1999 |
| DE | 100 64 249 A1 | 12/2000 |
| DE | 100 65 518 A1 | 12/2000 |
| DE | 101 00 880 A1 | 1/2001 |
| DE | 101 03 401 A1 | 1/2001 |
| DE | 101 11 551 A1 | 3/2001 |
| DE | 101 28 141 A1 | 6/2001 |
| DE | 101 32 386 A1 | 7/2001 |
| DE | 102 33 163 A1 | 7/2002 |
| EP | 0 952 459 A2 | 3/1999 |
| KR | 2002-080879 A | * 10/2002 |

* cited by examiner

*Primary Examiner*—Thu V. Nguyen
(74) *Attorney, Agent, or Firm*—Crowell & Moring LLP

(57) ABSTRACT

A motor vehicle includes a pre-safe system, which contains at least one vehicle periphery detection device and a suspension and shock absorber unit. The suspension and shock absorber unit is arranged between a chassis and a vehicle body and can be activated as a function of signals that are detected by the vehicle periphery detection device and evaluated in a data evaluation device. The data evaluation unit of the vehicle periphery detection device is connected to a control device of an active chassis control system, which activates the suspension and shock absorber unit, to perform a vehicle level adjustment that is predefined for the respective impact situation.

11 Claims, 3 Drawing Sheets

MOTOR VEHICLE WITH A PRE-SAFE-SYSTEM

BACKGROUND AND SUMMARY OF THE INVENTION

This application claims the priority of German patent document 103 37 620.8, filed Aug. 16, 2003, the disclosure of which is expressly incorporated by reference herein.

The invention relates to a motor vehicle with a "pre-safe" system which includes at least one vehicle periphery detection device and a suspension arrangement including a shock absorber.

Modern motor vehicles, which have a high safety standard, comprise active and passive safety devices that enable the driver to control his vehicle better, even in critical situations, and thus possibly avoid a vehicle accident. Such devices also help to lower the severity of the accident in case of a crash.

For this purpose, the so-called pre-crash phase, which designates the time period between recognizing (through appropriate vehicle detection systems) a high accident probability and the actual impact of the vehicle, is of special importance. According to results from real accident analyses, in about two-thirds of all accidents this time period immediately before a crash is sufficiently long to draw conclusions about the subsequent impact, to initiate corresponding measures to lower the severity of the accident, and to condition vehicle restraining systems and passengers with respect to the imminent accident.

Safety systems, which are effective in a preventive sense, even prior to a possible accident, and which utilize the pre-crash phase to expand protection of the passengers by employing additional safety measures and reducing the severity of the accident, are called pre-safe systems.

The essential components of a pre-safe system include a vehicle periphery detection sensor system, various versions of which are known.

For example European patent document EP 0 952 459 A2 discloses an object detecting device for a motor vehicle, which comprises a distance sensor system composed of a plurality of distance sensors. The latter are arranged on the motor vehicle so as to scan its environment. An evaluating unit uses data from the distance sensor system to determine the travel path and speed of an object relative to the motor vehicle. The distance sensors can optionally be selected by the evaluating unit and their range, measurement repetition frequency, resolution or operating mode can be modified. This device can make data for different driver assistance devices available simultaneously or successively, and can be used as a pre-crash sensor system.

German patent document DE 197 29 960 A1 describes a method for detecting impacts, especially for motor vehicles, for the purpose of activating passenger protection devices. At least one pre-crash sensor records variations of the relative speed and/or the relative distance of objects within a defined proximity of the vehicle periphery. If the change in relative speed detected by the pre-crash sensor is above at least one given threshold value and/or the relative distance is below a given threshold value, this situation is identified as a safety-critical condition, and the triggering threshold is reduced.

Another method for impact detection in a motor vehicle is disclosed in German patent document DE 101 00 880 A1, which uses radar sensors as the pre-crash sensors to determine an effective mass of an impact object. The effective mass is compared to predefined threshold values to classify the impact object, and the classification then determines the use of restraining devices.

Another method for triggering restraint means in a motor vehicle in case of an impact and/or a collision is described in German patent document DE 100 65 518 A1. In this known method, the acceleration time characteristic is detected in the form of at least one acceleration signal, from which the speed time characteristic is generated, and restraint apparatus that is adapted to a concrete impact situation is released. With the aid of a pre-crash sensor system the impact speed and time are determined in advance of the impact, and the impact situation is classified based on the impact speed. Based on this information, a release time window is determined within which the time characteristic of the speed is generated, and in parallel the acceleration signal is used to determine a threshold value for the speed, taking into consideration the classification of the impact situation. When this pre-crash sensor system comprises at least two suitably arranged pre-crash sensors, a triangulation method can be used to determine also the offset (ie., the impact location and the impact angle). For pre-crash sensing, in this respect for example radar measurements, infrared measurements or also optical measuring methods can be used.

An example for a pre-crash sensing system comprising an image recording device for optically detecting spaced objects is disclosed in German patent document DE 198 42 827 A1.

An increasing problem for traffic safety is the ever-increasing variation of vehicle types (including differences in vehicle geometry, weight, height and stiffness), which pose risks for passenger injuries during a collision. For example SUVs (Sport Utility Vehicles) and pick-ups are more rigid due to their design; in addition, they are higher and on average also heavier than common small cars or limousines. While the differences in size between the vehicles do not necessarily contribute to a so-called crash incompatibility as long as the weight ratio is roughly the same, the vehicle height, vehicle geometry and vehicle rigidity play a more important role with respect to the risk of injuries.

Known pre-safe systems can contribute only little to reducing the severity of the accident during a collision between vehicles of different types. For example, during a collision between an SUV and a limousine or a sports car, only little rigidity and mass compatibility exists between the vehicles. Particularly critical for the passenger is for example the impact of an SUV (with an elevated cross bar structure) on the side of a limousine or a sports car with a low side structure, so the rigid front structure of the SUV impacts the relatively soft area of a door on the limousine or the sports car and penetrates correspondingly far into the limousine or sports car.

A pre-safe system that permits an adjustment of the geometric position of crash elements of two accident partners is disclosed in German patent document DE 199 23 708 A1. In this known arrangement, a motor vehicle includes a sensor system for detecting an impending impact. In the event of an impending impact the sensor device emits a signal to a control device of the motor vehicle, which then causes a positional displacement of the vehicle body prior to the impact, at least on the impact side, by means of a suspension and shock absorber unit that is arranged between the chassis and the body. To ensure that the impact occurs at a height of the vehicle at which the accident-related deformation of the body is reduced and the passive safety devices of the vehicle unfold the best effect, the body is lifted or lowered on one side (the presumed impact side) prior to the impact. In order to ensure a fast positional displacement of the body in the case of an impending impact, the suspension and shock absorber units of the motor vehicle are equipped with pyrotechnic adjusting devices.

The disadvantage with this solution however is that the one-sided lowering or raising of the body is associated with considerable structure fluctuations, which for example when lifting the vehicle tail upon detection of an imminent rear impact, can cause a "dive" of the vehicle front. During a rear impact, the latter effect can cause the vehicle possibly to slide under the vehicle in front of it and can expose the vehicle passengers to further risks. Beyond that, a tilt motion of the vehicle can be confusing and unpleasant to the passengers. Moreover this system has the further disadvantage that additional actuators (in this case, the pyrotechnic devices) and corresponding control devices must be provided in order to lift or lower the body on the impact side.

One object of the present invention, therefore, is to provide an improved motor vehicle pre-safe system of the type mentioned above, which initiates preventive protective measures in a pre-crash phase, and which better protects the passengers of different types of motor vehicles at risk of a collision in case of an actual crash.

Another object of the invention is to provide such a system which can be implemented with the least amount of additional devices.

These and other objects and advantages are achieved according to the invention, by a motor vehicle, particularly a passenger car, comprising a pre-safe system that contains at least one vehicle periphery detection device and a suspension and shock absorber unit, arranged between a vehicle chassis and a body, which can be activated as a function of the signals that are received by the vehicle periphery detection device and evaluated in a data evaluation device. According to the invention, the data evaluation device of the vehicle periphery detection device is connected to a control device of an active chassis control system that activates the suspension and shock absorber unit. The chassis control system is used to perform a vehicle level adjustment that is roughly equal to a lifting motion and is predefined for the respective impact situation. Such a lifting level adjustment of the vehicle by the active chassis control system in response to a detected collision risk improves the energy absorption during the accident and hence the protection of the parties in the accident. Compared to a one-sided height adjustment of the body, the impact reaction during a level adjustment through the lifting motion does not result in the risk of a considerable dive of the vehicle on the side opposite the impact side, and hence during a rear impact even in the risk of moving beneath the vehicle in front.

In general the level adjustment utilizes a side skirt, a cross bar and a center tunnel of the vehicle more for the dissipation of energy (i.e., the impact energy can be dissipated more specifically via the side skirt/cross bar/tunnel line of force).

In an advantageous embodiment of the invention, during a side collision a bumper of the impact vehicle directly contacts a side skirt of the impacted vehicle, providing a high level of energy absorption with the formation of folds on the side skirt, and considerably reducing the intrusion and penetration risk of a vehicle door.

In addition to minimizing penetration into the vehicle interior, it is an object of the passenger protection system during a side impact to achieve a relatively early interception of the passenger. Thus, the intention is to keep the passenger/vehicle contact speed as low as possible, which in turn equates to an early interception and hence pre-acceleration of the passenger. A pre-safe system pursuant to the invention reduces this contact time considerably, especially for the upper body region. The contact speed in the pelvic region of the passenger remains in a tolerable range.

The pre-safe system according to the invention can beneficially be implemented with existing safety and comfort systems in modern vehicles, since it only requires the establishment of a logical connection to a known vehicle periphery detection system (which uses ultrasound, infrared, radar technology or also image detection), and to an active chassis control system, which is already in some cases incorporated as a standard feature.

The active chassis control system selecting the suspension and shock absorber unit can be a chassis system that is known in practice under the term "Active Body Control" (ABC) system.

This Active Body Control system developed by Mercedes Benz consists essentially of a plunger actuator, which is connected in series with a passive steel spring element as well as a hydraulic shock absorber connected in parallel thereto. (That is, this so-called plunger actuator is essentially arranged in series with a conventional suspension strut of a passenger car.) Selection of the plunger actuator occurs individually for each vehicle wheel by means of a control valve. For energy provision purposes an accumulator system and a hydraulic pump are provided, with which a specific selection of the respective control valve can be performed and the respectively desired plunger actuator or the plunger actuator that is suitably actuated by an electronic system is supplied with hydraulic medium or from which said medium is removed.

In order to achieve a high driving comfort level while simultaneously increasing driving dynamics and safety, this system performs a body motion and position detection of the vehicle by means of vertical, longitudinal and cross acceleration sensors as well as by means of level and plunger path sensors, which serve as information sources of a complex control logic system. Electronic control of the hydraulic system occurs based on established control strategies and maps on the basis of measuring variables that describe the current motion of the vehicle body. Hereby the driver can select between a comfort-oriented map and a sports-oriented map by the push of a button.

The preferred Active Body Control system is a so-called semi-active system since the control range of active intervention is limited to 5 Hz. This way all low-pass body motions in the direction of the vehicle vertical axis, (due especially to road influences), about the vehicle transverse axis (from braking and accelerating, and) about the vehicle longitudinal axis (caused in particular by driving in curves and a non-level road that is different on the left and the right) can be minimized as needed, and can be optimally dampened. Higher-frequency vibrations of the wheels are absorbed and damped in this embodiment with conventional passive elements, such as e.g., steel springs and shock absorbers with constant adjustment. Such a concentration of the active intervention of body-relevant low frequencies lowers the demand on the actuators with respect of the reaction speed.

Of course the invention can also be implemented with variations of this Active Body Control system, as described for example in German patent document DE 101 11 551 A1, or with a fully active chassis control system.

The described pre-crash level adjustment can beneficially be included in the circumstances of a real accident situation, wherein the variation frequency of the development and the course of the accident can be taken into consideration in the activation by the control device 8 of the active chassis control system 9.

Depending on the expected impact situation, the level adjustment of the body occurs in a controlled or non-controlled fashion to a lower position of the body or to a maximum height position of the body, which can be at least 40 mm to 50 mm, preferably 80 mm to 90 mm, above a zero position of the body, in a short response time, which amounts to e.g. 0.2 to 0.4 sec. until the maximum height position is reached.

Other objects, advantages and novel features of the present invention will become apparent from the following detailed description of the invention when considered in conjunction with the accompanying drawings.

DETAILED DESCRIPTION OF THE DRAWINGS

Figure 1:
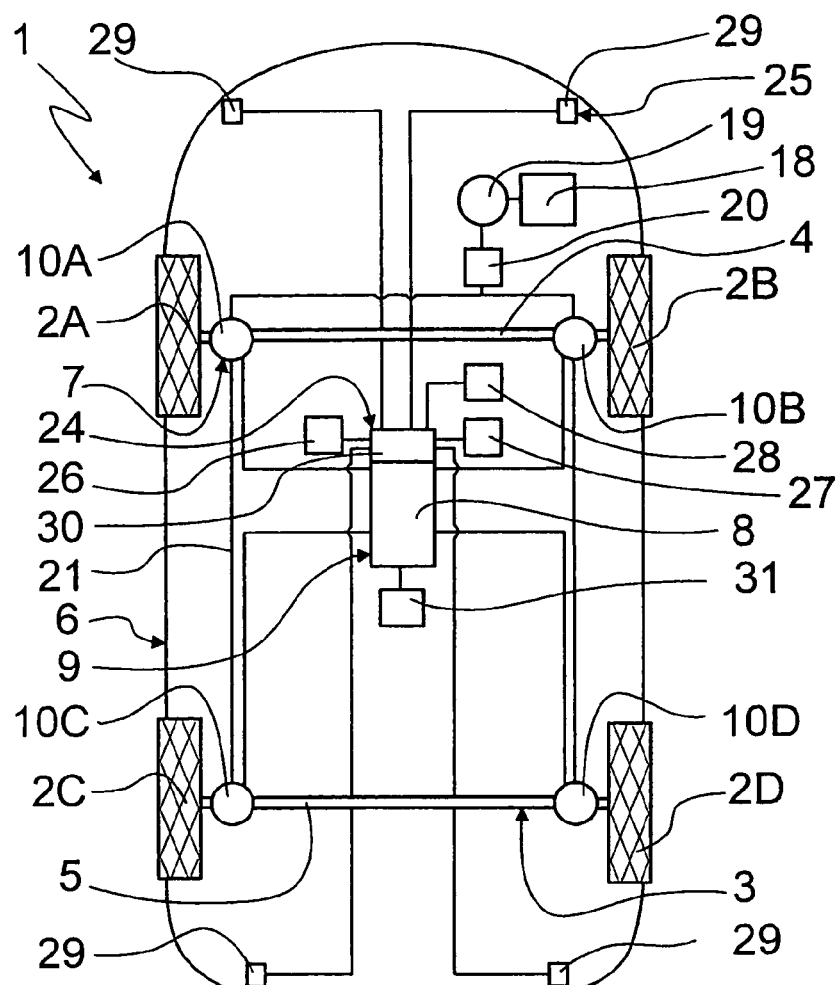
FIG. 1 is a schematic diagram of a motor vehicle with essential components of a pre-safe system pursuant to the invention.

In FIG. 1, a passenger car 1 includes a chassis 3 that is responsible for guiding the vehicle wheels 2A, 2B, 2C, 2D which are mounted on a front axle 4 and a rear axle 5 are shown. For suspension and shock absorption of a body 6 of the motor vehicle 1 in relation to the chassis 3, a suspension and shock absorber unit 7 is selected by a control device 8 of an active chassis control system 9 and is part of a so-called Active Body Control system.

Each vehicle wheel 2A through 2D is assigned a respective suspension strut 10A through 10D, (shown in greater detail in FIG. 2), which unites the basic components of a partially active and partially passive suspension and shock absorber system, (i.e., a series connection of a steel spring and a hydraulic cylinder as well as of a shock absorber arranged parallel thereto) in one sub-assembly.

Figure 2:
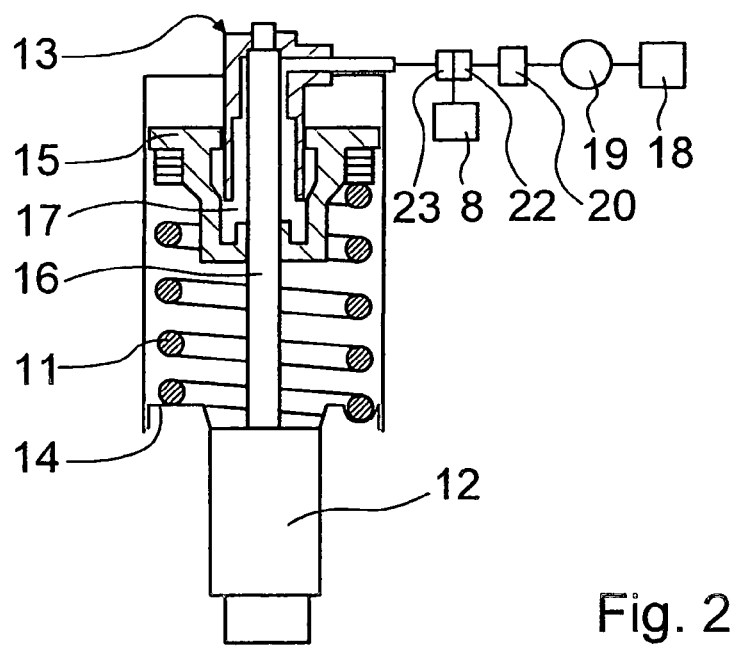
FIG. 2 is a sectional view of a suspension strut of the motor vehicle from FIG. 1, which is part of an Active Body Control system.

The sub-assembly of the suspension strut 10A is shown by way of example in FIG. 2. It contains a spring 11, a shock absorber 12 and a base adjustment 13, which is implemented in the form of a single-acting cylinder. The spring 11 is supported on one hand by a spring collar 14 that is firmly connected with the shock absorber and on the other hand by a plunger 15, which encloses a hydraulic chamber 17 along with a plunger rod 16. To ensure that the spring 11 does not lift under any circumstances, residual prestress is provided for a full rebound.

In the plunger rod 16, which is hollow in the present case, a plunger path sensor is integrated, which operates based on the chronometry measuring principle and detects the running time of a torsion impulse, which is displayed on a measured length in accordance with the magnetostriction principle. To accomplish this, a magnet in a position transmitter generates a mechanical torsion impulse with constant propagation speed in a known manner. The running time of the impulse is proportional to the wavelength and is converted into a corresponding output signal in a corresponding sensor electronic system.

To provide adjusting energy for a level adjustment of the body 6 on the suspension struts 10A through 10D, it is useful to employ a high-pressure hydraulic system, in which an oil flow from a hydraulic reservoir 18 via a suitable pump 19 (for example, an intake-restricted radial piston pump) reaches a unit 20, which comprises a pulsation dampener for noise reduction, a pressure control valve for limiting the system pressure and a pressure sensor for monitoring the system pressure and for pressure control.

The hydraulic medium reaches valve blocks on the front axle 4 and on the rear axle 5 via high pressure lines 21, wherein the valve blocks each comprise a 3/3-port proportional control valve 22 per vehicle wheel 2A through 2D for filling and emptying the assigned plunger 15 and hence for controlling the hydraulic medium flow to the suspension strut and from the suspension strut into the hydraulic reservoir 18, as well as a check valve 23, which prevents the body 6 from lowering during standstill.

Apart from the hydraulic reservoir 18, an additional accumulator can be provided on each axle, to supply additional energy during peak stress situations.

The shown Active Body Control system with the active chassis control 9 permits an all-round level control, in which beneficially a constant vehicle level is set that is independent of its load, which establishes an optimal distance in front of a vehicle wheel to a wheel cut-out contour of a fender of the body 6. Additionally a manually adjustable level lifting system may be provided for the purpose of increasing ground clearance as well as a manual level lowering system (for example by means of suspension leveling) for the purpose of lowering the vehicle gravity point and improving driving stability. Automatic level lowering can occur for example also when exceeding a predefined speed so as to improve the vehicle behavior and reduce fuel consumption.

Of course level lowering and raising can also be performed in stages. In the present embodiment for example at the push of a button, a level lift to a first level of the body 6 of 25 mm above a normal level and then again to a second level of 50 mm above the normal level is possible with the engine running as well as with a standing and a driving vehicle.

The suspension and shock absorber unit 7 interacting with the active chassis control system 9 is a major component of a pre-safe system of the motor vehicle 1 in FIG. 1.

Another major component of the pre-safe system is a safety sensor system 24, which comprises a vehicle periphery detection device 25, a vehicle condition sensor 26, an impact sensor 27 and an interior space sensor 28. The safety sensor 24 of the motor vehicle 1 in the present case is used as a function of the risk stage of the motor vehicle in various stages.

The components of the safety sensor system 24 can be designed in a known manner, such as is disclosed, for example in one of the patent documents cited at the beginning.

In the present case the vehicle periphery detection device 25 represents a known 24 GHz radar near-field sensor with a range of approximately 20 m to 30 m and a tracking range of about 6 m, including several distance sensors 29, the number of which is selected such that the periphery around the motor vehicle 1 is detected in its entirety.

The signals of the distance sensors 29 are processed in a data evaluation unit 30 into information regarding distances and speeds relative to a possible collision obstacle (such as another motor vehicle, an immobile obstacle or a pedestrian), as well as regarding a possible impact angle. The distance sensors 29 transmit strictly bundled electromagnetic waves in the form of short pulses. When an object is hit, these sources are reflected, and by measuring the running time of the pulse between the motor vehicle 1 as the transmitter and the obstacle as the echo location, the distance between these two objects can be determined. The speed of an object relative to the vehicle 1 can also be measured with the aid of the Doppler effect.

The vehicle periphery detection device of other known systems may also be employed; however, care should be taken in their activation that especially the surroundings of the vehicle are monitored reliably (e.g., by means of a lateral radar sensor) to ensure the special effectiveness of the pre-safe system pursuant to the invention during side impact.

During normal operation, the vehicle state sensor 26 analyzes important variables regarding vehicle movement dynamics (such as e.g., vehicle speed, wheel speeds, vehicle longitudinal and transverse acceleration, yaw rate, spring deflection or excursion path, vehicle level, and steering speeds), and compares these actual values to predefined target values. Based on these comparisons, dynamic systems relating to vehicle movement, such as e.g., an anti-lock system and an electronic stability program, to support the driver in critical driving situations, and to avoid an accident.

The crash sensor or impact sensor system 27 detects an expected impact within just a few milliseconds, and forwards information about the severity of the accident to the data evaluation device 30. In this respect acceleration sensors, pressure sensors, intrusion sensors and contact sensors, which control for example pyrotechnic restraining systems, have been known to be used.

The vehicle state sensor 26, the pre-crash sensor and/or the vehicle periphery detection device 25 and the impact sensor 27 can be supplemented with the interior space sensor 28, which provides information about the status of the passengers, passenger position and the available restraint systems.

The data from the data evaluation device 30 is emitted to the control device 8 of the active vehicle control system 9, wherein the data evaluation device 30 can also be integrated in the control device 8.

Apart from signals from the data evaluation device 30 the control device 8 also receives sensor signals that detect all movements of the body 9, the respective plunger path as well as the hydraulic pressure and the operating temperature. The control device 8 uses these input signals to generate the necessary control signals for the actuators of the active chassis control system 9, and monitors its internal components as well as all input and output signals for errors.

Connecting the data evaluation device 30 of the vehicle periphery detection device 25 with the control device 8 of the active chassis control system 9 permits a pre-crash level adjustment, in which upon detection of an impact situation by the data evaluation device 80 a predefined, lifting vehicle level adjustment is performed for the respective impact situation.

In the simplest embodiment, when a crash situation is detected, a non-controlled height increase of the entire body 6 can be provided for a limousine or for a motor vehicle with a comparable body level, since for such vehicles the likelihood of a broader inclusion of a skirt structure of the impact vehicle 6 into the crash situation is the greatest and the relief for passengers through a level adjustment is greater, especially in the upper body region, the lower the point of impact of the bumper of the impacting vehicle.

Figure 3:
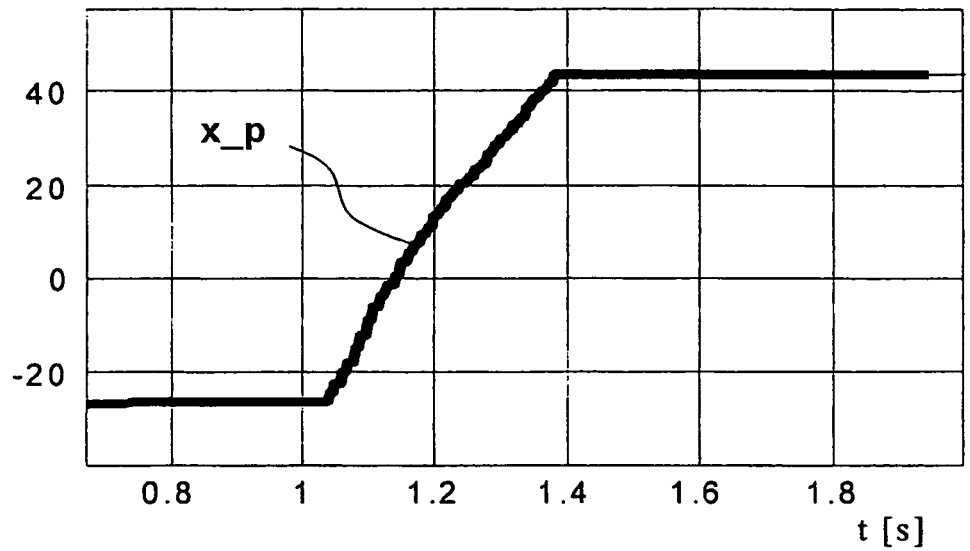
FIG. 3 is a graphic depiction of the course of a path of a plunger of the suspension strut from FIG. 2 with a vehicle level increase with non-controlled activation.

FIG. 3 shows the plunger path x_P of a plunger 15 with a non-controlled activation of the actuator of the active chassis control system 9 for lifting the body 6. When the control valves 22 are activated with a maximum current of for example 1 ampere, then a height adjustment of the vehicle body is achieved that corresponds to the maximum capability of the entire system. The relatively constant curve increase of the plunger path x_P shows that the active chassis control system 9 is in a position to build up a direct maximum adjusting speed. Hereby a plunger path of for example 70 mm is reached in 0.33 sec.

Figure 4:
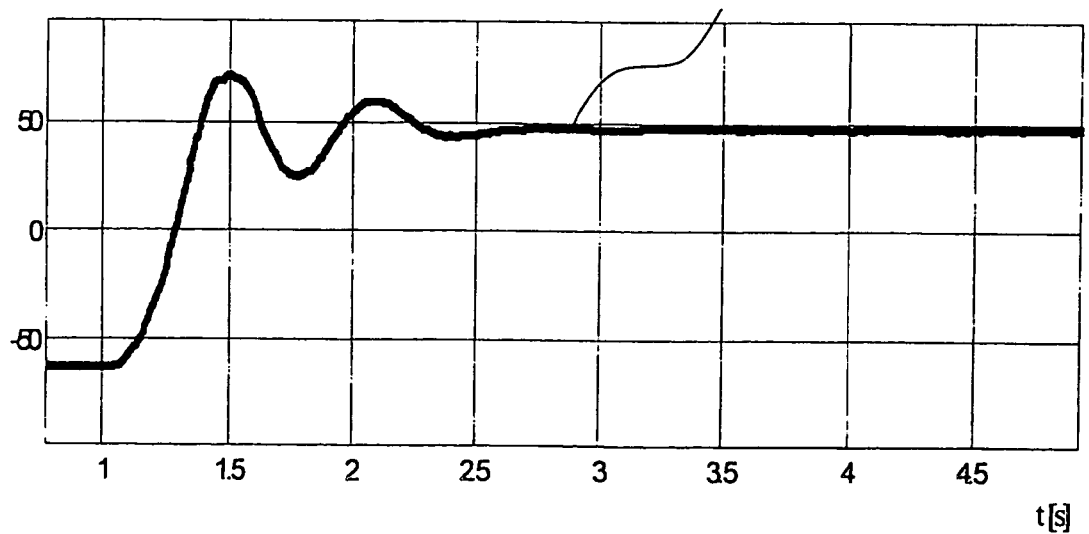
FIG. 4 illustrates an excursion of a spring of the suspension strut from FIG. 2 during the non-controlled vehicle level adjustment pursuant to FIG. 3.

FIG. 4 illustrates the spring excursion x_F over the time t with a non-controlled vehicle height adjustment with the plunger path x_P pursuant to FIG. 3. A spring excursion (and hence a vehicle level increase) of more than 130 mm is reached within 0.33 seconds with a plunger path of 70 mm while taking the gear ratio into consideration.

Just as a non-controlled maximum lifting motion for a vehicle level lift upon detection of an impact situation can be performed, a lowering of the vehicle level can also be conducted by suddenly releasing air from a suspension leveling system, whereby a lowering speed of 200 mm/sec can be achieved. This is important especially for pedestrian protection since upon detection of a pedestrian as the collision object an upper engine hood edge should be as low as possible and hence in vehicles with a high build such as an SUV the quickest possible lowering of the vehicle level is required.

Figure 5:
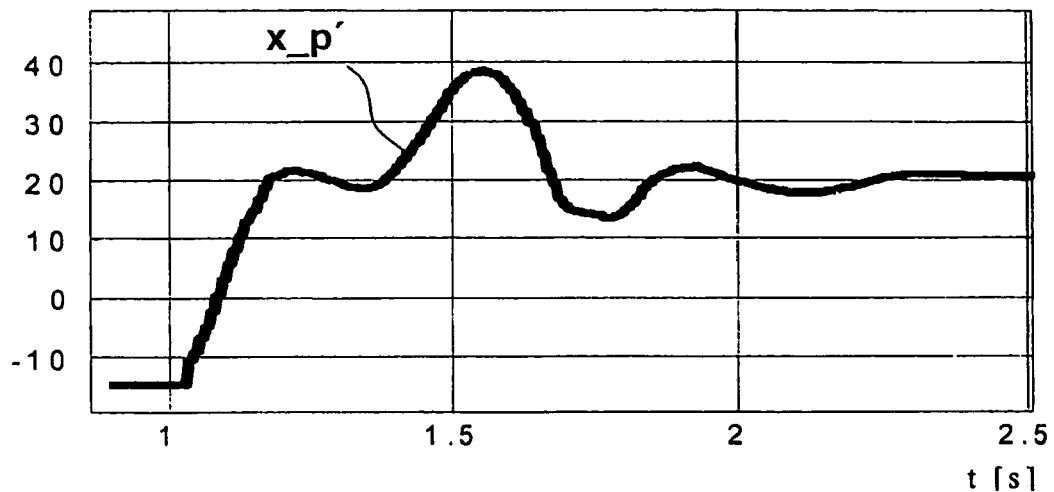
FIG. 5 shows the course of a plunger path pursuant to FIG. 3 with a vehicle level adjustment with controlled selection.
Figure 6:
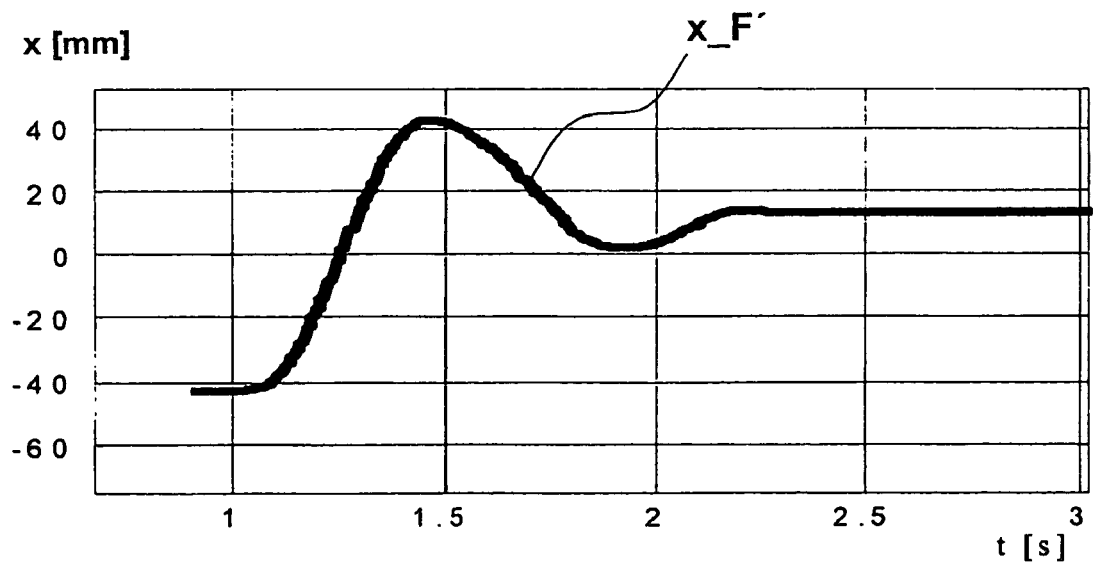
FIG. 6 shows the course of the spring excursion in a depiction that corresponds to FIG. 4 with a controlled level control adjustment pursuant to FIG. 5.

With a controlled activation of the actuator system as shown in FIG. 5 and FIG. 6 also a maximum plunger path adjustment is made, however this adjustment is executed through a certain amount of absorption and a stabilization so as to avoid or stabilize too much overshooting of the body 6 during a level adjustment.

As is evident from the course of the plunger path x_P' shown in FIG. 5, the controlled activation does not have a linear path as compared to the non-controlled selection with respect to a dampened level height adjustment.

Compared to the course of the spring excursion x_F' shown in FIG. 6 corresponding to the plunger path x_P' pursuant to FIG. 5, it can be seen that after a drop in the plunger path after about 1.25 sec. the course of the spring excursion x_F' continues on a nearly linear path, which indicates a lower body vibration and/or lower subsequent vibration of the body. In the controlled activation shown here, for example, a plunger path x_P' of 55 mm is reached within a time of 0.4 sec., resulting in an average adjusting speed of about 134 mm/sec.

Assuming an activation time of the active chassis control system 9 with a non-controlled activation of 0.2 sec. and a controlled activation of 0.3 sec. for a plunger path adjustment of for example 41.2 mm and a relative speed measurement isochronous with the distance measurement, an upper limit for the relative speed of a [within] 6 m detected object for a controlled selection of 67.5 km/h can be assumed for a non-controlled selection of 107.5 km/h.

In addition to statements about the time of the impact information about the expected severity of the accident can also be collected with the use of the near-field detection sensor 25. An adaptive release of the pre-crash level adjustment is thus also possible in the case of an activation speed that corresponds to the actual conditions.

Thus with a high relative speed towards an expected collision object, the maximum adjustment possibilities of the suspension and shock absorber unit 7 can be exhausted so that upon start of the collision the higher positioning or lowering of the vehicle has been completed.

The present pre-safe system however is also in a position to act based on the situation (ie., to implement variable adjusting times in order to condition the motor vehicle 1 for a crash). For example when sensing an unavoidable collision at a low relative speed, the level adjustment can be performed comparatively more slowly, making it more beneficial for the passenger and the vehicle movement dynamics.

Predefined impact situations stored in a map, and the type of a detected collision object, may also be used as further parameters, for varying the height and the speed of the vehicle level adjustment.

Advantageously, the motor vehicle 1 contains a transmit-receive unit 31, which interacts with the control device 8 of the inventive pre-safe system and can transmit and receive signals representing the vehicle type. Electronic vehicle/vehicle communication systems as well as vehicle/radio station/vehicle communication systems are known as such and can be used to generate control signals of the control device 8, such that the control device 8 initiates a lowering or lifting of the body 6 as a function of processing a vehicle type signal and corresponding level data that is stored in the control device 8, in order to adjust a vehicle level that is optimal for the crash.

The pre-safe system with vehicle level adjustment presented here can of course be combined with any existing electronic pre-crash systems or be integrated in these, wherein the synergies of active and passive safety systems can be utilized. For example for triggering the pre-crash level adjustment, trigger signals of additional, known safety systems for active safety may be utilized. Such a signal is e.g., the brake assist system (BAS), which is installed as a standard feature and which is operated during emergency braking situations with a corresponding brake pedal speed. When using for example such a signal of the brake assist system as the triggering threshold for conditioning the vehicle that is impacted by the expected collision, the full braking time up to the collision can be used to achieve a lower or higher positioning of the body. As a function of the existing speed the control device 8 can calculate a time that remains until the collision and coordinate it with the active chassis control system 9.

In addition to a brake assist system signal the intervention of an electronic stability program (ESP) can be used as an indication for a critical driving situation. Even in cases in which no braking reaction occurs, such a system can adjust the vehicle body height due to an unstable driving behavior, which is detected by the electronic stability program.

If neither a braking intervention nor a critical driving situation exists, the vehicle state sensor 26 of the foregoing beneficial embodiment of the pre-safe system ensures adequate level adjustment in a pre-crash situation.

In addition or alternatively to the non-controlled or controlled pre-crash driving level adjustment, it is also possible to provide a speed-dependent pre-crash level adjustment, which is combined e.g., with a speed-dependent level adjustment that is already stored in the active chassis control system 9. For example with vehicle speeds in inner-city traffic—for example up to 65 km/h—it is beneficial to operate the vehicle 1 in this speed range constantly at a level that is elevated from zero position since statistics show that 80% of accidents occur in this speed range. When exceeding this speed limit, the vehicle level can be lowered in order to increase driving comfort and the dynamics of vehicle movement, wherein these steps can occur if necessary in stages by speed categories.

In summary it should be noted that with the motor vehicle 1, equipped according to the invention with a pre-crash level adjustment system, a reversible system is provided that serves to increase not only the interior safety (ie., the protection of the passengers), but also the exterior safety of the accident partner since the probability of an injury and/or the severity of injuries of traffic participants outside the vehicle, such as e.g. bicyclists and pedestrians, is reduced in case of a collision with the vehicle after a level adjustment in the pre-crash phase.

With respect to passenger protection the severity of injuries of passengers of an impacted vehicle of a lower design is clearly reduced especially in the case of side collisions. This can largely be attributed to the direct inclusion of a side skirt in the energy absorption process, resulting in a decrease in edge penetration, which leads to a decrease in effects on the passengers in the thorax region.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with a pre-safe system, comprising:
   at least one vehicle periphery detection device including a data evaluation unit; and
   a suspension and shock absorber unit that is arranged between a vehicle chassis and a vehicle body; wherein,
   the suspension and shock absorber unit can be activated as a function of signals that are detected by the vehicle periphery detection device and evaluated in a data evaluation device;
   for activating the suspension and shock absorber unit, the data evaluation unit is connected to a control device of an active chassis control system;
   the chassis control system performs a vehicle level adjustment that is substantially a lifting motion;
   the level adjustment is predefined for a respective impact situation;
   the lifting motion for the vehicle level adjustment occurs in a controlled fashion upon detection of an impact situation; and
   the adjusting time for the vehicle level adjustment is variable as a function of relative speed between the vehicle and a collision object.

2. The motor vehicle pursuant to claim 1, wherein the height and speed of the vehicle level adjustment are predefined by the control device as a function of one of a detected impact situation and a detected collision object.

3. The motor vehicle pursuant to claim 1, wherein:
   the control device is connected to a transmit-receive unit, which transmits a signal representative of the vehicle type and is designed to receive a signal representing a vehicle type from a potential collision partner; and
   wherein the control device changes a level of the body upon processing this signal representing the vehicle type and corresponding vehicle level data stored in the control device.

4. The motor vehicle pursuant to claim 1, wherein a lifting motion occurs for vehicle level adjustment purpose upon detection of an impact situation.

5. The motor vehicle pursuant to claim 4, wherein the body is adjusted to a maximum height position upon detection of an impact situation.

6. The motor vehicle pursuant to claim 1, wherein the maximum height position of the body is at least 40 mm to 50 mm above a zero position of the body and an adjusting time until the level adjustment into the maximum height position is 0.2 to 0.4 sec.

7. The motor vehicle pursuant to claim 6, wherein the maximum height position of the body is at least 80 to 90 mm above a zero position of the body.

8. The motor vehicle pursuant to claim 1, wherein the vehicle periphery detection device is part of a safety sensor system, which further comprises at least one of a vehicle state sensor, an impact sensor and an interior space sensor.

9. The motor vehicle pursuant to claim 1, wherein the vehicle periphery detection device is a radar near-field sensor, with a range of approximately 20m to 30m and a tracking range of about 6m.

10. The motor vehicle pursuant to claim 9, wherein said sensor is a 24GHz radar near field sensor.

11. The motor vehicle pursuant to claim 1, wherein:

the suspension and shock absorber unit includes a plunger for each vehicle wheel;

the plungers are arranged in series with a passive spring element as well as parallel to a hydraulic shock absorber; and the plungers can be activated individually.

* * * * *